May 6, 1924.
W. HAHNEMANN ET AL
DEVICE FOR CONVERTING A CONTINUOUS FLOW OF ENERGY INTO A WAVE LIKE FLOW OF ENERGY
Filed April 6, 1923
1,493,340
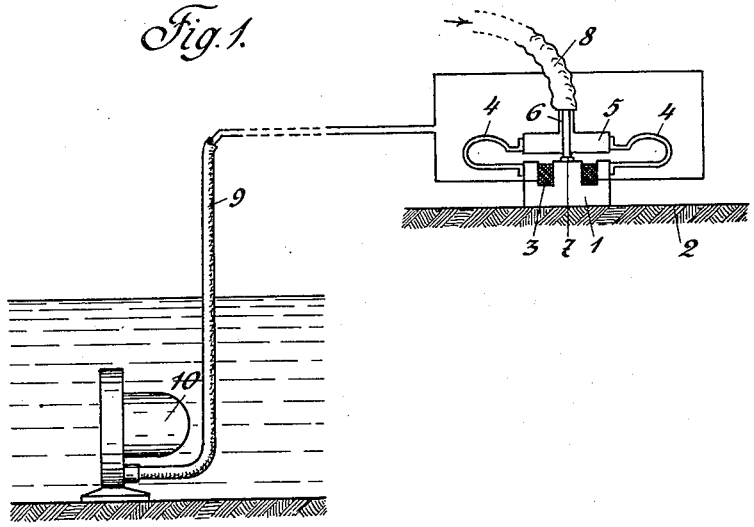
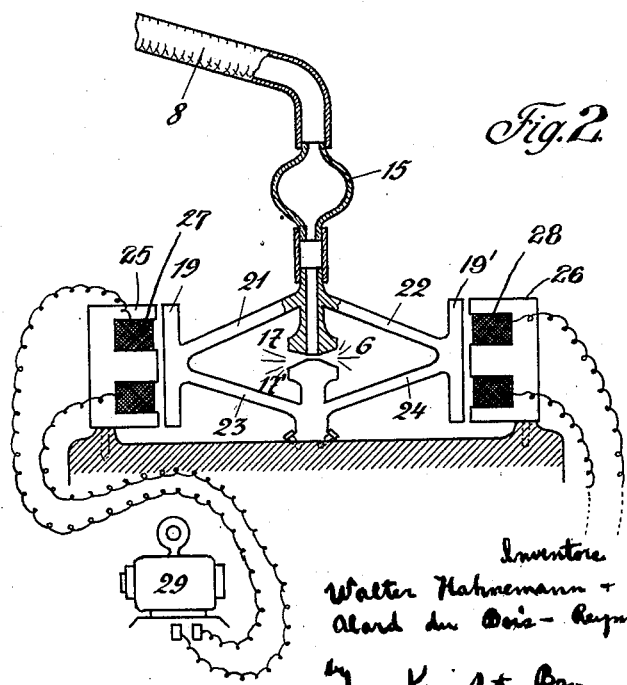

Patented May 6, 1924.

1,493,340

UNITED STATES PATENT OFFICE.

WALTER HAHNEMANN, OF KITZEBERG, NEAR KIEL, AND ALARD DU BOIS-REYMOND, DECEASED, LATE OF PLON, NEAR KIEL, GERMANY; BY ELEONORE DU BOIS-REYMOND, ADMINISTRATRIX, OF PLON, NEAR KIEL, GERMANY, ASSIGNORS TO SIGNAL GESELLSCHAFT MIT BESCHRÄNKTER HAFTUNG, OF KIEL, GERMANY, A FIRM.

DEVICE FOR CONVERTING A CONTINUOUS FLOW OF ENERGY INTO A WAVELIKE FLOW OF ENERGY.

Application filed April 6, 1923. Serial No. 630,421.

*To all whom it may concern:*

Be it known that we, WALTER HAHNEMANN, a citizen of the German Republic, residing at Kitzeberg, near Kiel, in the county of Schleswig-Holstein and State of Prussia, Germany, and ALARD DU BOIS-REYMOND, deceased, late a citizen of the German Republic, residing at Plon, near Kiel, in the county of Schleswig-Holstein and State of Prussia, Germany, have invented certain new and useful Improvements in Devices for Converting a Continuous Flow of Energy into a Wavelike Flow of Energy, of which the following is a specification.

This invention relates to the problem of producing wave-like energy as for example an alternating current or sound in a simple and an efficient manner by means of a continuous flow of energy such as a current of air.

A known method of producing alternating currents consists in oscillating by mechanical power systems which are electromagnetically or inductively coupled to each other. It has also been proposed to employ for this purpose structures or bodies capable of executing natural vibrations, but these structures were connected to separate driving machines so that the speed of these machines (speed of revolution) determined the rate of oscillation and hence the frequency of the alternating current produced.

The object of this invention is to produce an apparatus or machine which consists chiefly of one or more oscillatory structures which, when operated or affected by a continuous or non-periodic force, are caused to vibrate at their natural rate of vibration and then give out energy in the form of electric, magnetic or mechanical waves, as for example an alternating current or sound. In contra-distinction to known devices the periodicity of the energy produced is determined in the novel arrangement by the natural rate of vibration of the vibratory structure or body within the arrangement itself. It is thus seen that whilst in known arrangements of this class the constancy of the alternating current or movement as to its frequency depends on the constancy of the speed of revolution or motion of the driving machine, the said constancy depends in the arrangement according to the invention only on the constancy of rate of vibration of the oscillating system so that the achieved constancy is very much greater. The constancy which can be attained with extremely simple means and with a moderate damping of the oscillating member by the novel method is such that the variations do not exceed more than a few periods per thousand, a result which, if it is to be achieved by rotary machines, requires very complicated arrangements.

For this reason the new device, when used as a machine for generating alternating currents, is particularly important as a source of current supply to all electrically operated devices which require great constancy of frequency, as for example acoustical and electrical signalling devices (under-water sound-signalling, telegraphing over wires or without wires etc.). When the novel device is employed as a sound producer the receiving devices that respond to the sound emitted by it need only be very slightly damped because there is very little danger of the frequency of the produced sound deviating from the frequency of resonance of the receiver.

Another advantage is that no separate machine is required for driving or operating the vibrating member. This applies particularly to arrangements according to the invention whose vibratory member or vibratory structure is operated by a current of liquid or gas.

To obtain a high efficiency with the novel machine it is important that the vibratory structure or system have portions executing different amplitudes of motion. Thus if the machine serves to produce alternating electric current, and has magnetic parts which vibrate relatively to each other, it may happen that one or more of these parts have to execute motions of greater amplitude than the part or parts arranged at the actuating fluid inlet, as for example the parts located opposite the inlet nozzle. Another feature of the invention therefore consists in the provision of a vibratory structure or system which is capable of transforming up or down the original amplitude of motion imparted to it.

In order to fully utilize the actuating gas or liquid current for both phases of the vibration of the structure either reversing valves or a circulating system may be employed, or resonators of the same natural period as the vibrating member may be interposed in the conduits through which the actuating medium is conducted to the vibratory structure or system, and the size of these conduits may be such that the actuating medium participates in the vibrations at the vibrating member. This can be accomplished by producing stationary waves in the said conduits.

The invention is illustrated by way of example in the drawing in which—

Fig. 1 shows a device in which the armature of magnetic system is caused to vibrate by a fluid that flows continuously through a suitable conduit, the alternating current produced in a coil arranged on the magnet being conducted into an under water sound producer, and Fig. 2 shows an apparatus that may serve as a dynamo and at the same time as a sound producer and which has a vibratory structure acting in a vibratory way as a toggle lever and a resonator for utilizing both phases of the actuating flowing medium.

The apparatus shown in Fig. 1 comprises a magnet 1 provided with a coil 3 and arranged on a fixed support 2. Opposite to the pole pieces of the magnet and held by springs 4 is an armature 5 which has an opening through which extends a pipe 6 constructed in the form of a nozzle that almost abuts against a resisting member 7 attached to the face of the magnet. A hose 8 conducts the current of actuating fluid to the nozzle. The alternating current produced in the coil 3 as a result of the vibrations of the armature is conducted through wires 9 to the current consuming device, which, as shown in Fig. 1, is an electrically operated under-water sound sender or producer 10.

It will be obvious that the vibrating part needs not be the armature but that the magnet instead or both the armature and the magnet may vibrate. If the form of generator employed is one of the known types of devices in which an alternating current coil or short circuited ring is oscillated in a magnetic field, this oscillating part will preferably be made to serve as the vibrating element.

In the example shown in Fig. 2 all the features of the invention are combined. The actuating fluid is conducted by the pipe 8 through the resonator 15 to the nozzle 6. The vibratory structure comprises the masses 17, 17′ and 19, 19′ and lever like connecting elastic members 21, 22, 23, 24. These elastic members are in effect two elastic members 21, 22 and 23, 24 arranged in spaced parallel relation to each other and converging toward a mass 19 or 19′ at each end. The actuating fluid passes through the mass 17 and enters between 17 and 17′ and causes these masses to execute periodic vibrations relatively to each other. When these masses 17 and 17′ are set in vibration, the whole vibratory structure or system takes up the vibrations, so that masses 19 and 19′ vibrate toward and away from each other. These masses 19 and 19′ act as shown as armatures of electromagnets 25, 26 which produce alternating currents in the coils 27, 28, which currents may be conducted to the current consuming appliances such as the motor 29 (or sound producers as 10 in Fig. 1). Because of the toggle arrangement shown of the vibratory structure the masses 19 and 19′ execute oscillations of different amplitude than those executed by the masses 17 and 17′.

The vibratory structure consisting of a plurality of distinct masses connected by an elastic member or members is not claimed per se in this application. It forms the subject matter of copending application Serial No. 435,563, filed January 6, 1921.

We claim:—

1. Apparatus for producing alternating movement of definite frequency, comprising a source of fluid, a vibratory structure, means for directing a continuous unidirectional flow of said fluid against said vibratory structure to set it in vibration, and a resonator in the fluid path between said source and said vibratory structure adapted to respond to the vibrations of said vibratory structure.

2. Apparatus for producing alternating movement of definite frequency, comprising a source of fluid, a vibratory structure, a conduit for directing a continuous unidirectional flow of said fluid against said vibratory structure to set it in vibration, and a resonator in said conduit adapted to respond to the vibrations of said vibratory structure.

3. Apparatus for producing alternating movement of definite frequency, comprising a source of fluid, a vibratory structure, and means for directing a continuous unidirectional flow of said fluid against said vibratory structure to set it in vibration; said vibratory structure consisting of at least three distinct masses and elastic means constituting a toggle connection between them.

4. Apparatus for producing alternating movement of definite frequency, comprising a source of fluid, a vibratory structure having a plurality of distinct masses connected by two elastic members which latter are arranged in spaced parallel relation to each other and converge toward a mass at each end, a centrally arranged mass on each elastic member, and means connected to one of said centrally arranged masses for directing a continuous unidirectional flow of said fluid against the other centrally arranged mass to excite the vibratory structure.

5. Apparatus for generating alternating electric currents, comprising a vibratory structure, a source of fluid, means for causing a continuous unidirectional flow of said fluid to excite said structure, and means having an electromagnetic field associated with said vibratory structure and arranged to utilize the vibrations of said structure to generate alternating electric currents.

6. Apparatus for generating alternating electric currents, comprising a vibratory structure, a source of fluid, means for causing a continuous unidirectional flow of said fluid to excite said structure, and an electro-magnetic system in the field of which a portion of said structure vibrates to produce alternating electric currents in said electro-magnetic system.

7. Apparatus for generating alternating electric currents, comprising a vibratory structure, a source of fluid, means for causing a continuous unidirectional flow of said fluid to directly impinge upon and excite said structure, and an electromagnetic system in the field of which a portion of said structure vibrates to produce alternating electric currents in said electromagnetic system.

8. Apparatus for generating alternating electric currents, comprising a vibratory system, a source of fluid, means for causing a continuous unidirectional flow of said fluid to excite said vibratory system, and an electromagnetic system in the field of which a portion of said vibratory system vibrates to produce alternating electric currents in said electromagnetic system.

9. Apparatus for generating alternating electric currents, comprising a vibratory system, a source of fluid, means for causing a continuous unidirectional flow of said fluid to impinge directly upon and excite said vibratory system, and an electromagnetic system in the field of which a portion of said vibratory system vibrates to produce alternating electric currents in said electro-magnetic system.

10. Apparatus for generating alternating electric currents, comprising a vibratory structure having portions executing different amplitudes of movement, a source of fluid, means for causing a continuous unidirectional flow of said fluid to excite said structure at a point having a certain amplitude of movement, and an electromagnetic system in the field of which a portion of said structure having a different amplitude of movement vibrates to produce alternating electric currents in said electromagnetic system.

WALTER HAHNEMANN.
ELEONORE du BOIS-REYMOND,
*Administratrix of estate of Alard du Bois-Reymond, deceased.*